United States Patent [19]
Babcock et al.

[11] 3,711,598
[45] Jan. 16, 1973

[54] INCREASED RECOVERY IN DUAL TEMPERATURE ISOTOPE EXCHANGE PROCESS

[75] Inventors: Dale F. Babcock, Wilmington, Del. 19809; John S. Neill, Landenberg, Pa. 19350

[73] Assignee: The United States of America as represented by the United States Atomic Energy Commission

[22] Filed: May 11, 1971

[21] Appl. No.: 142,324

[52] U.S. Cl. ................................................423/580
[51] Int. Cl. .........................C01b 5/02, C01b 17/16
[58] Field of Search ......23/204 R, 204 C, 210 I, 181; 423/580, 563

[56] References Cited

UNITED STATES PATENTS 3,549,323   12/1970   Babcock..............................23/204 R Primary Examiner—Oscar R. Vertiz
Assistant Examiner—Hoke S. Miller
Attorney—Roland A. Anderson

[57] ABSTRACT

A liquid with a gas each containing a desired isotope flow counter-currently through two liquid-gas contacting towers. The towers are maintained at different temperatures to enrich the liquid in the isotope within the cold tower and the gas in the isotope within the hot tower. Liquid, having the natural concentration of the desired isotope, is fed into the top of the cold tower and gas flowing upwardly through the towers is recirculated from the top of the cold tower into the bottom of the hot tower. The liquid feed is then increased and a portion of the liquid is withdrawn from an intermediate location in the upper portion of the cold tower and fed into the lower portion of the hot tower to increase the productivity of the process. This process is particularly applicable to the recovery of deuterium oxide from water.

7 Claims, 2 Drawing Figures

INCREASED RECOVERY IN DUAL TEMPERATURE ISOTOPE EXCHANGE PROCESS

BACKGROUND OF THE INVENTION

The invention described herein was made in the course of, or under, a contract with the U. S. Atomic Energy Commission.

1. Field of the Invention

This invention relates to an improvement in the dual-temperature, isotope exchange process for concentrating an isotope of an element by its exchange between two substances at two temperatures. This process has been of major importance in the manufacture of heavy water.

In the breadth of application of the dual-temperature isotope exchange process to which the instant invention relates, a system is employed which comprises one or more stages of pairs of hot and cold liquid-gas contacting towers wherein two substances are made to flow in countercurrent relationship. One of the two substances is fed to the first stage of the system, enriched in the isotope to be concentrated by preferential isotope exchange in the first of the pair of towers of that stage, depleted in the isotope in the second tower to below the feed concentration and discharged from the system as waste. The other substance is continuously circulated through the system as the separating agent in an essentially closed recycle flow. At a point where the isotope concentration is high, a portion of the flow of one or both substances is withdrawn for further processing, as in another stage, and then returned, thereby effecting the net removal of relatively pure isotope. In the application of the process to the concentration of heavy water, the deuterium isotope is exchanged between water feed and continuously circulated hydrogen sulfide gas to attain concentration of the deuterium in the water.

Heavy water, deuterium oxide ($D_2O$), is useful as a moderator for nuclear reactors. It has been most commonly obtained from natural water where the ratio of deuterium atoms to the total hydrogen atoms present is only about one part in 7,000 which corresponds to a concentration of about 0.0147 mole percent $D_2O$, This very dilute concentration and the similarities of the properties of $D_2O$ with $H_2O$ makes heavy water expensive to produce. This is true even though produced, as at present, in commercial scale quantities of hundreds of tons/year.

2. Description of Prior Art

The principles governing the conventional, dual temperature isotope exchange process are explained in such references as U. S. Pat. No. 2,787,526 entitled "Method of Isotope Separation" issued Apr. 2, 1957 to J. S. Spevack, assignor to the U. S. Government; USAEC R&D Report DP-400 entitled "Production of Heavy Water — Savannah River and Dana Plant — Technical Manual" Du Pont Co., Aiken, S. C. (1959); and "Production of Heavy Water," by W. P. Beddington and V. R. Thayer, Chemical Engineering Progress, Vol. 55, No. 9, pp. 70–78 (Sept. 1959).

A recent improvement in the dual temperature process is disclosed and claimed in U. S. Pat. No. 3,549,323 entitled "Improvement in Dual Temperature Isotope Exchange Process," issued Dec. 22, 1970 to D. F. Babcock, assignor to the U. S. Government. The process improvement in this patent is further examined in USAEC R&D Report DP-1204 "Predicted Performance of GS Process with Supplemented Feed to the Hot Tower," M. P. Burgess, Du Pont Co., Aiken, S. C. (April 1970). A brief summary of the conventional dual temperature process, hereafter referred to as the GS process, and this recent improvement immediately follows to facilitate an understanding of the present invention.

While water is a compound of hydrogen and oxygen represented by the formula $H_2O$, any body of naturally occurring water contains a significant quantity of hydrogen-oxygen compounds wherein one of the hydrogen atoms is the heavier isotope deuterium. This is expressed by the formula HDO. (At higher concentrations of deuterium, the isotope form $D_2O$ becomes significant.) In naturally occurring water about 1/7000 of the hydrogen atoms present are the deuterium isotope. Similarly, hydrogen sulfide while mostly $H_2S$, also contains a measurable quantity of the isotopic form HDS.

When hydrogen sulfide gas and liquid water are intimately contacted, there is a rapid equilibration of the deuterium isotope between oxygen compounds and sulfur compounds thereby fixing the relative proportions of $H_2O$, HDO, $H_2S$ and HDS. Deuterium has a substantial preference for combination with oxygen rather than sulfur. However, this preference is stronger at a low temperature than at a higher temperature. This may be conveniently expressed by the equation

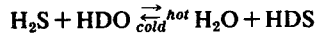

$$H_2S + HDO \underset{cold}{\overset{hot}{\rightleftarrows}} H_2O + HDS$$

This difference in the equilibrium distribution of deuterium at different temperatures is the mechanism that the GS process exploits to effect concentration of $D_2O$.

In the GS process, water flows down through a cold tower and then through a hot tower in countercurrent relation to an upward flow of hydrogen sulfide gas. The water is progressively enriched in deuterium as it passes downward through the cold tower and progressively depleted in deuterium as it passes downward through the hot tower. Conversely, the hydrogen sulfide stream is enriched in deuterium as it passes upward through the hot tower and depleted in deuterium as it passes upward through the cold tower. Accordingly, the concentration of deuterium in each of the streams is maximum at the bottom of the cold tower and at the top of the hot tower, or figuratively speaking, between the towers. A portion of the enriched water and gas between the hot and cold towers is withdrawn for further processing to effect a net removal of relatively pure $D_2O$ product together with slightly depleted streams that are returned to the first stage. The depleted water from the first stage is disposed of as waste and the hydrogen sulfide stream is continuously recycled as the separating agent.

The capital investment in equipment necessary for practicing the GS process is very high. The capital investment at the Dana and Savannah River Plants amounted to about $120.00 per "annual pound" for the GS portion of the plants alone. Enormous quantities of fluids must be handled. Heretofore, extraction of about 20 percent of the deuterium in the feed water has been considered to be the economic rate. At that recovery rate, about 35,000 pounds of water must be fed for every one pound of $D_2O$ recovered. The gas flow rate per pound of $D_2O$ produced is even greater. Heretofore, about 140,000 pounds of gas has been cycled between the towers for every pound of $D_2O$ extracted. As will be readily appreciated by those familiar with the chemical engineering aspects of the GS process, it is this enormous gas flow that largely determines the diameter of the towers and size of other required equipment, the energy input per unit of product, and accordingly, the cost of the $D_2O$ produced. By far the largest portion of the energy consumed by the process is related to the heat reversals and attendant loss of nonrecoverable heat associated with this enormous $H_2S$ gas flow. The incentive in increasing the productivity of the process, and particularly with relation to the gas flow is, therefore, apparent.

The relationship of the liquid and gas flows must be controlled within narrow limits in order for the process to be productive. As explained in AEC R&D Report DP-3 entitled "S-Process Pilot Plant — First Run Results and Process Principles," D. F. Babcock, C. B. Buford, Jr., and J. W. Morris, Du Pont Co., Wilmington, Delaware (1951), and further elucidated in J. W. Morris and W. C. Scotten, Chemical Engineering Progress Symposium Series, Vol. 58, No. 39, (1962), variation from optimum liquid-gas ratios (L/G) by as little as 5 percent in either direction drastically decreases productivity of the plant.

However, the above mentioned improvement patent to D. F. Babcock teaches that the productivity of the GS process can be significantly improved by purposely violating — and by more than 5 percent — the optimum L/G ratio in the lower portion of the hot tower. Liquid having the natural concentration of the isotope is added to the lower portion of the hot tower at a rate of up to about 200 percent of that fed to the top of the cold tower without significantly changing the gas flow rate. The L/G ratio in the remainder of the hot tower and in all of the cold tower are maintained at about the optimum ratio discussed in the references.

The present invention is an improvement to the basic GS process and to the process of U. S. Pat. No. 3,459,323. It has been found that the L/G ratio can be increased substantially above the presumed optimum L/G ratio in yet another portion of the system not suggested or taught in the cited improvement patent to further increase the productivity of the process. Also it has been found that an increased production of $D_2)O$ can be achieved as a result of this increased L/G ratio.

SUMMARY OF INVENTION

It is an object of this invention to increase the productivity of the dual temperature isotope exchange process. It is a further object of this invention to increase the productivity of that process by modification of the system that requires relatively little additional equipment and achieves the increase in productivity at economically attractive operating costs. It is also an object of this invention to increase the liquid to gas ratio substantially above the previously considered optimum in select portions of the system and at the same time increase productivity of the process. It will be understood that while as a matter of convenience the invention is described herein in relation to the specific application of the dual temperature isotope exchange process wherein the concentration of deuterium is effected by its exchange between $H_2S$ and $H_2O$, — which at present is the only economically significant application of the process—the invention has general application to the dual temperature isotope exchange process. This general application of the invention will be readily appreciated by those familiar with this process.

According to the instant invention, increased productivity, realized as in increased rate of production or higher concentration product, or both, is obtained by increasing the L/G ratio to substantially above the previously presumed optimum ratio both within the upper portion of the first stage cold tower and the lower portion of the first stage hot tower. This increased productivity is obtained by increasing the liquid feed to the top of the cold tower and withdrawing a portion of the liquid from a location in the upper portion of the cold tower and adding this withdrawn or bypassed liquid to a location in the lower portion of the hot tower.

The effect of this increased flow of liquid through the lower portion of the hot tower is to increase the deuterium concentration in the liquid on all plates below the introduction point of the bypassed liquid. The additional concentration of deuterium in the liquid drives more deuterium into the gas and consequently more deuterium is carried upward into the cold tower to increase the concentration or the amount of product. A further increase in productivity is gained by first slightly enriching the bypassed liquid in deuterium as well as saturating it with $H_2S$ within the upper portion of the cold tower prior to its introduction into the lower portion of the hot tower. The deuterium concentration of the liquid and the gas in the lower portion of the hot tower is correspondingly increased to provide this further increase in production.

Optimum rates of increased feed liquid and withdrawn liquid as well as the optimum locations for withdrawing the liquid from the cold tower and adding to the hot tower depend upon process and economic conditions and parameters relating to a particular plant. Generally speaking, the amount of increase in feed liquid is about equal to the rate of liquid withdrawn. Liquid withdrawal rates up to an amount corresponding to about 50% of the feed rate to the cold tower are generally economically feasible. The optimum locations for withdrawal of liquid from the cold tower and the optimum locations for introduction of this liquid into the hot tower are determined either experimentally or by calculation such that maximum productivity or minimum unit cost is achieved. These optimum locations for the particular dual temperature process described herein are generally within the upper one half portion of the cold tower and the lower one half portion of the hot tower.

BRIEF DESCRIPTION OF DRAWINGS

The present invention is illustrated in the accompanying drawings wherein.

DESCRIPTION OF PREFERRED EMBODIMENTS

Figure 1:
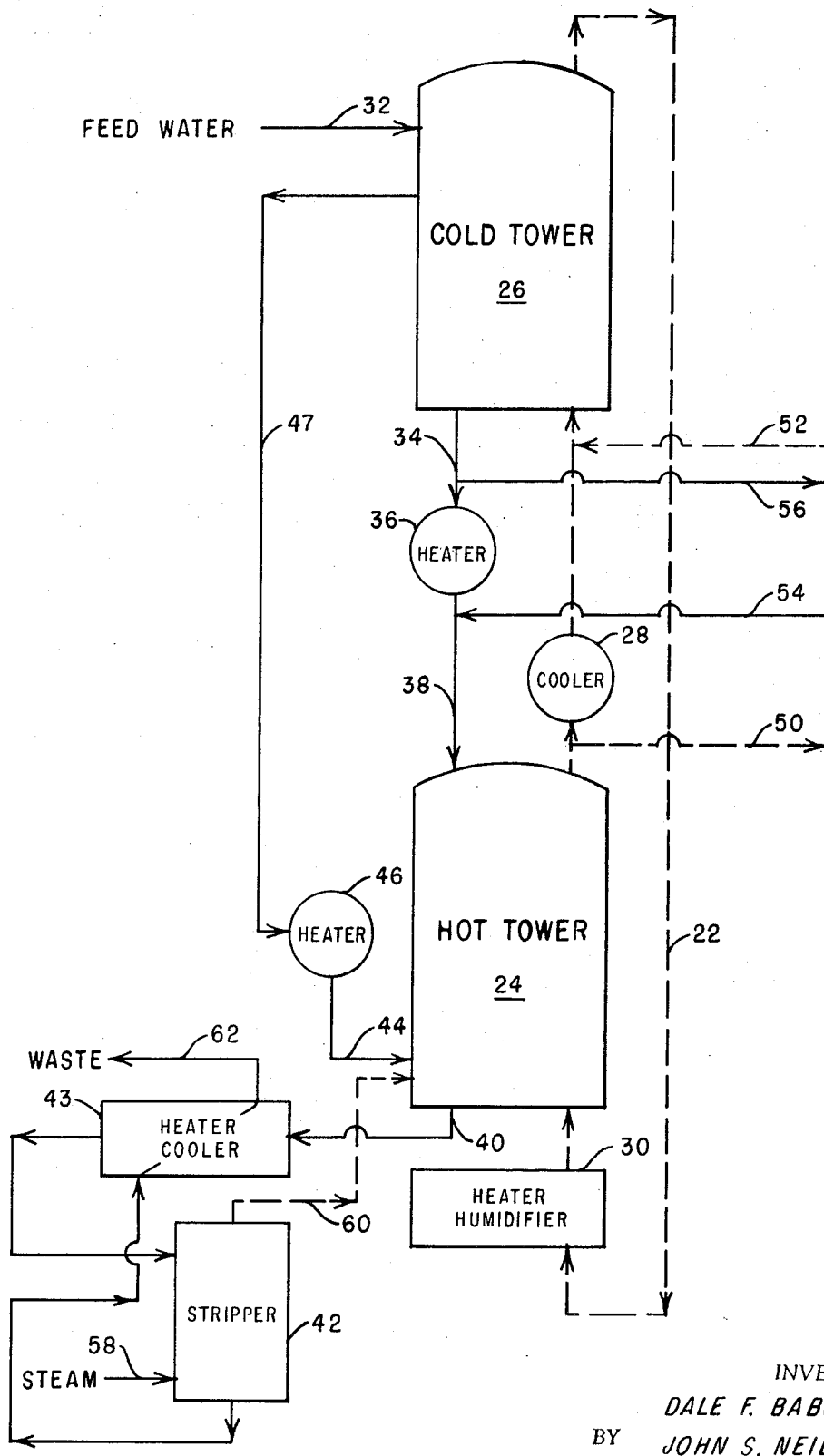
FIG. 1 is a schematic diagram showing the flows of $H_2O$ and $H_2S$ in accordance with the invention in an otherwise conventional GS process.

Referring to FIG. 1, the flow of the liquid water and hydrogen sulfide gas in accordance with the invention is illustrated in diagrammatic manner. For ease in understanding the flow of these substances, the components of the heat recovery loops have been omitted and the required changes in enthalpy in the various streams are indicated simply as heaters and coolers in the respective flow lines. Conventional items such as gas blowers, liquid pumps, valves, etc., have been omitted from the drawings since their use will be readily understood by those familiar with chemical engineering processes. While the drawing shows the flows of water and $H_2S$ according to the invention in the first stage of a plural stage GS process arrangement, the invention is equally applicable for single or plural stage arrangements and to each stage thereof. As a matter of economic practicability a GS process production facility would most likely be a plural stage arrangement. The liquid water flows are represented by solid lines and the $H_2S$ gas flows by conventional dashed lines throughout.

With the exception of the improvement according to the invention, which will be specifically pointed out hereinafter, the drawing is a conventional flow sheet for the GS process. An essentially closed cycle 22 of $H_2S$ gas circulates upwardly through hot tower 24, cold tower 26 and then returned to hot tower 24. The structure of liquid-gas contacting towers 24 and 26 may be of any suitable design well known in the chemical engineering art. The $H_2S$ gas is cooled before entry into cold tower 26 and heated and humidified prior to its return to hot tower 24. These changes in enthalpy are figuratively represented by cooler 28 and heater-humidifier 30. While heater-humidifier 30 has been shown as being separate from hot tower 24, those familiar with the GS process will recognize that the heater-humidifier can be physically incorporated into the bottom of the hot tower. However, this physical incorporation of the heater-humidifier into the hot tower is merely a matter of engineering convenience and, generally, the functions of the two sections remain distinct.

The usual feed water stream, after suitable preconditioning as may be required by equipment not shown, enters the top of cold tower 26 through conduit 32. The usual temperature for the cold tower is about 30° C. As this water flows down the cold tower it is sequentially contacted by the countercurrent flow of $H_2S$ gas, such contacting being enhanced by any suitable means, such as packing material, contacting plates, etc., in the towers. The water is continually enriched in deuterium as it proceeds through cold tower 26 due to the higher preference of the deuterium isotope to combine with oxygen than with sulfur. Conversely, the $H_2S$ gas is continuously depleted in deuterium as it proceeds up the cold tower in countercurrent relation to the water. The enriched water exits cold tower 26 through conduit 34, and is heated by suitable means shown figuratively as liquid-heater 36 to about hot tower temperature, most usually about 140° C. The water and evolved gas enter the top of hot tower 24 through conduit 38. As the liquid proceeds down the hot tower it is continuously depleted in deuterium content due to the relatively lower preference of the deuterium for the oxide form at the higher temperature. Water depleted in deuterium is discharged from the bottom of the tower through conduit 40, and after necessary stripping of the $H_2S$ gas dissolved therein, such as in stripper 42, and heat removal by heating of other streams (illustrated figuratively by heater-cooler 43) the water depleted in deuterium is discharged to waste at 62. Steam is added into stripper 42 through conduit 58 as a stripping agent to return the $H_2S$ to the hot tower through conduit 60. Additional steam may be added at other locations for humidification and to maintain the temperature of the hot tower.

The described first stage may be coupled to a subsequent stage or stages, not shown, by cascading portions of the liquid and gas streams flowing between the first stage towers. Cold liquid enriched in deuterium is carried forward to the top of the second stage cold tower through conduit 56. Hot, humidified gas enriched in deuterium is carried forward to the bottom of the second stage hot tower through conduit 50. Cold gas is returned from the top of the second stage cold tower via conduit 52 and water is returned to the first stage through conduit 54.

Up to this point the described process flow sheet is that of a conventional GS process. To this conventional flow sheet is added a bypass conduit 47 for transferring a portion of the water flowing within the upper portion of the cold tower 26 to the lower portion of hot tower 24.

The withdrawn liquid in bypass conduit 47 is heated to hot tower temperature by a suitable heater 46 before it enters the hot tower through conduit 44. The rate of feed water entering the cold tower at 32 is increased by about the same amount as is withdrawn through conduit 47. This additional feed water allows the upper portion of cold tower 26 and the lower portion of hot tower 24 to each operate for maximum productivity at a higher liquid to gas ratio than the corresponding liquid to gas ratio within the remaining lower portion of the cold tower and within the remaining upper portion of the hot tower respectively.

The effect of these process changes increases the concentration of deuterium in the liquid within the lower portion of the first stage hot tower and thereby drives more deuterium into the gas stream that is flowing upwardly through the hot tower. Since the volume of the gas stream is not significantly changed, the deuterium concentration therein is increased and the concentration or quantity of product withdrawn between the two towers is increased. This increase in liquid concentration and productivity is in addition to the amount provided by adding feed liquid directly into the lower portion of the hot tower as is disclosed in U. S. Pat. No. 3,549,323. This further increase in productivity is gained by slightly enriching the additional feed liquid in deuterium as well as saturating it with hydrogen sulfide within the upper portion of the cold tower before adding this liquid to the lower portion of hot tower. The amount or fraction of liquid withdrawn through bypass conduit 47 from cold tower 26 will be sufficient to allow the remaining bottom portion of cold tower 26 and the top portion of hot tower 24 to operate at about the conventional L/G ratios.

The optimum amount of additional feed and withdrawn liquid will depend on such factors as the cost of steam, the cost of heat exchange, the specific process conditions relevant to that particular plant, and the gain in productivity for the particular flow fraction withdrawn. Although productivity is increased with each increase in amount of withdrawn liquid, the rate of increase diminishes with increased liquid withdrawal. This is illustrated for the present invention in a deuterium oxide recovery process by the following table:

TABLE I

| Withdrawal rate-percentage of feed | Potential productivity gain over conventional GS process |
|---|---|
| 10% | 4.25% |
| 25% | 8.5% |
| 50% | 11.2% |

It can be determined from the above table that increased withdrawal and feed rates bring less than a proportional increase in productivity and that the rate of productivity increase diminishes at the higher withdrawal rates.

Consequently, it is expected that withdrawal rates in excess of about 50 percent in the particular dual temperature process described herein would involve too great an added operating expense in treating the additional feed liquid, heating the withdrawn liquid before introduction into lower portion of the hot tower, and stripping dissolved $H_2S$ from the increased flow of waste water to be economically feasible. Accordingly, bypassed liquid up to about 50 percent of the water fed to the cold tower while maintaining approximately the same L/G ratio in the bypassed portion of the system as in conventional operation is of particular relevance to the present invention.

Figure 2:
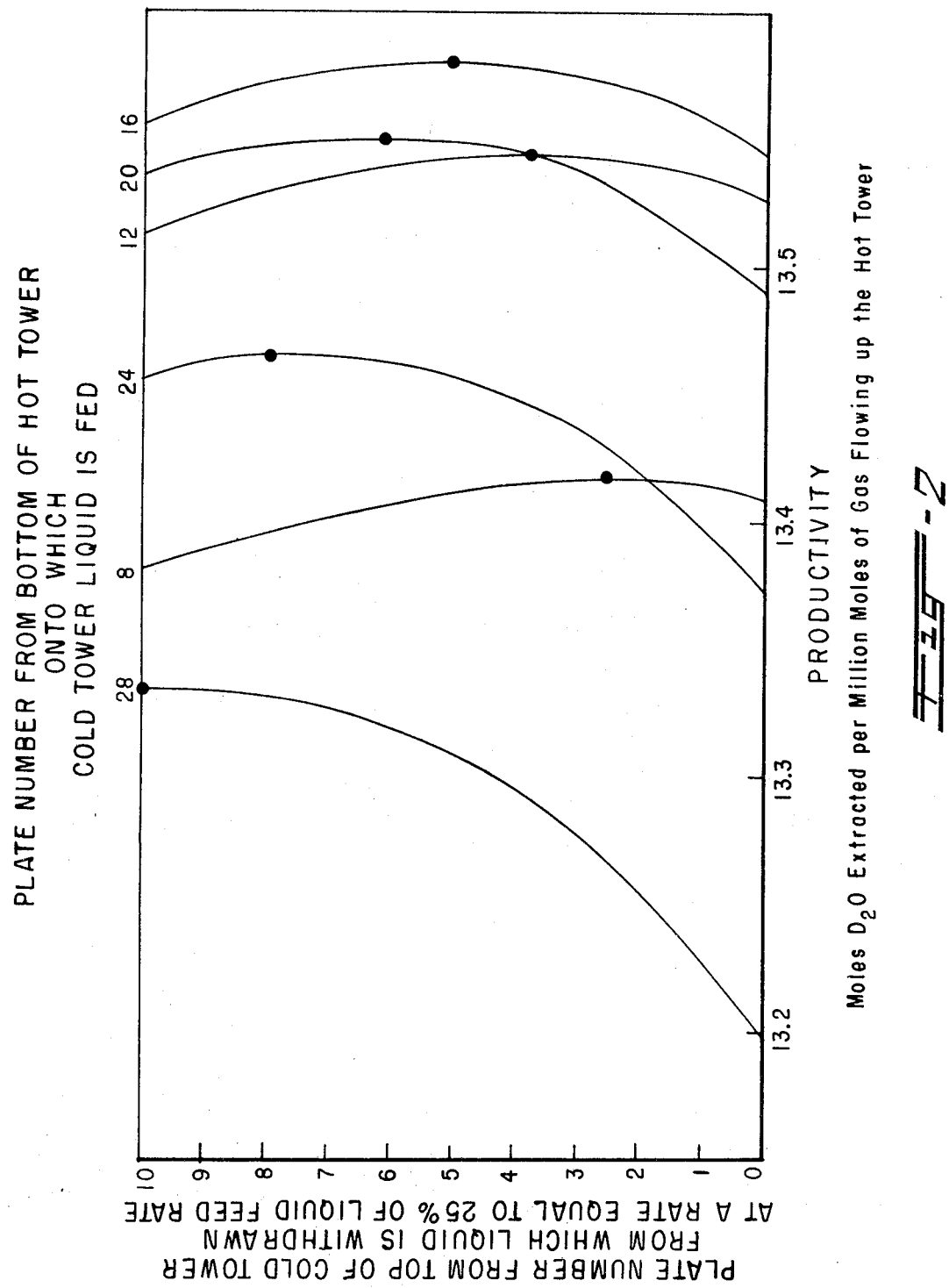
FIG. 2 is a graph showing the productivity achieved with the instant improvement as a function of plate selection.

The optimum locations for withdrawing the liquid from the cold tower and for reintroducing the withdrawn liquid into the hot tower are discussed in reference to FIG. 2. This figure is a graph showing the calculated productivity of deuterium oxide per million moles of humid hydrogen sulfide gas flowing upwardly through the hot tower plotted against the plate number from the top of the cold tower from which liquid is withdrawn at a rate equal to 25 percent of the feed water rate. The plate number from the bottom of the hot tower onto which the withdrawn liquid is reintroduced is treated as a parameter to produce the family of curves designated plate Nos. 28, 24, 20, 16, 12 and 8. These plate numbers in both the hot and the cold towers correspond to plate numbers in actual towers used at the Savannah River Plant for the conventional GS process. The hot tower includes 70 total plates, but the ten bottommost plates make up a humidifier section incorporated into the tower as a matter of engineering convenience and are not of direct interest here. Consequently, only the top 60 plates of the hot tower directly participate in the deuterium exchange reaction. Therefore, the plate numbers pertaining to the hot tower in FIG. 2 are numbered beginning above those plates employed as a humidifier. The cold tower includes 69 plates all of which are employed in the exchange operation and are numbered from the top down.

The data for the graph of FIG. 2 were computed by the application of principles outlined in DP-400, cited above, to a single-stage model of the GS process. Withdrawal and reintroduction at a rate equal to 25 percent of the liquid feed rate was selected merely because it is at about the center of the estimated economical range set forth above.

On each curve corresponding to a hot tower plate, a large dot is constructed to point out the optimum cold tower plate for withdrawal. For instance, liquid reintroduced on the 28th, 24th and 20th plates should be withdrawn on the 10th, 8th and 6th plates to achieve optimum productivities of 13.334, 13.465 and 13.549 respectively. Although some of these productivities are less than could be achieved by merely adding the increased feed water to the 16th plate above the bottom of the hot tower, an increase in production is nevertheless realized over merely adding the increased feed water to the corresponding plate in the hot tower. This productivity gain can be estimated by noting the productivity at the horizontal axis intercept in FIG. 2.

The horizontal axis corresponds to a mode of operation including saturating the extra feed water with hydrogen sulfide at the top of the cold tower without deuterium enrichment and then introducing this water into the lower portion of the hot tower at the indicated plate. This mode of operation gives a slight increase in productivity over merely adding the extra water into the lower portion of the hot tower. It will be clear that this gain in productivity resulting from saturation of the feed water will become more significant as increasing amounts of water are withdrawn for reintroduction. Consequently the gain in productivity from the application of the present invention is slightly larger than the gain indicated by the difference between the productivity for withdrawing water on a plate below the top of the cold tower and the productivity at the horizontal axis of FIG. 2.

The optimum location for introducing the withdrawn liquid stream into the lower portion of the hot tower is at the plate or level where there will be a minimum of deuterium concentration difference between the added liquid and the process liquid after steady state operation is reached. This optimum level moves down the tower as the flow rate of added liquid increases. Since it is the purpose of this added liquid to increase the deuterium concentration in the lower portion of the hot tower, some increase in productivity can be gained by adding the withdrawn liquid at points other than the optimum location. It can be seen from FIG. 2 that an increase in production can be gained over the conventional process by adding the withdrawn liquid to any point between the 8th and 28th plates or more broadly to a location within the lower one half of the hot tower.

The optimum location for withdrawing liquid from the cold tower also varies with the increased feed and withdrawal rate. Large withdrawal rates with correspondingly increased feed rates would be taken from near the top of the cold tower to allow a sufficient enrichment of the remaining liquid. Small quantities can be withdrawn at lower levels in the tower to enrich the withdrawn liquid as much as feasible. The following table illustrates how the optimum locations for withdrawal and reintroduction into the hot tower vary with the withdrawal rate. The table was obtained through computations based on the single stage duel temperature isotope exchange process described in conjunction with FIG. 2.

TABLE II

| Withdrawal | Plates in Cold | Plates in Hot |

| Rate-Percentage of Feed | Tower Above Withdrawal Point | Tower Below the Introduction Point |
|---|---|---|
| 10% | 10 | 20 |
| 25% | 5 | 16 |
| 50% | 1 | 8 |

Some increase in productivity can be gained by withdrawing and reintroducing the liquid at other than the optimum locations. However, it is estimated, for the particular dual temperature process described herein, that significant increased productivity can be gained by with-drawing liquid from the upper one half of the cold tower and reintroducing this liquid into the lower one half of the hot tower.

The above table and FIG. 2 show that for a 25 percent withdrawal rate the highest productivity can be gained by withdrawing the liquid from the 5th plate from the top of the cold tower and reintroducing the liquid onto the 16th plate from the bottom of the hot tower. A productivity of 13.580 moles $D_2O$ per $10^6$ moles of gas is realized while a conventional GS process without the increased feed rate would under similar process conditions produce 12.515 moles of $D_2O$ per $10^6$ moles of gas. This corresponds to a production increase of 8.5 percent. If a like amount of feed liquid were introduced at the 16th tray of the hot tower without passing through any portion of the cold tower, as is described in U. S. Pat. No. 3,549,323, a productivity of only 13.539 moles of $D_2O$ per $10^6$ moles of $H_2S$ gas would be realized. Hence, at the liquid withdrawal rate of FIG. 2 the method of the present invention provides an increase in productivity of about 0.3 percent over the process in the above cited patent. However, at higher withdrawal rates it is expected that the increase in productivity would be greater.

The specific process conditions employed in calculating the above productivity increases are given in the following Example:

EXAMPLE

A cold tower having 69 plates at 60 percent efficiency is operated at 32° C and a corresponding hot tower having 60 plates at 69 percent efficiency is operated at 144° C. A humid gas stream including hydrogen sulfide and water vapor is circulated through the two towers at a rate of 200,000 moles per hour in the hot tower. Feed water at 101,000 moles per hour enters the top of the cold tower and flows downward over the plates. Just below the 5th plate from the top of the cold tower 25,200 moles per hour or about 25 percent of the feed water is withdrawn and reintroduced just above the 16th plate up from the bottom of the hot tower. The remainder of the feed water continues down through the remainder of the plates in the cold tower and through all of the plates in the hot tower. In addition roughly 20 percent of the hot gas stream is condensed on leaving the hot tower and the condensate is returned to the hot tower along with the liquid flowing from the cold tower. Accordingly the ratios of moles of liquid to moles of gas are: 0.642 in the upper portion of the cold tower, 0.486 in the lower portion of the cold tower, 0.584 in the upper portion of the hot tower, and 0.709 in the lower portion of the hot tower. Comparable liquid to gas ratios in the conventional GS process are 0.5 in the cold tower and 0.6 in the hot tower.

The invention described herein provides a method for increasing the productivity of the dual temperature isotope exchange process. The increase in production is in addition to that attainable by the method described in U. S. Pat. No. 3,549,323 at optimum conditions and at less than optimum but similar process conditions. Although the gain in productivity is small over that achieved by the process of the above cited patent, it can be implemented with little expense and few process modifications.

What is claimed is:

1. In the dual-temperature, isotope-exchange process for concentrating an isotope of an element by its exchange between two substances containing said element, one in liquid and one in gas phase, in a system comprising at least one pair of liquid-gas contacting towers which are maintained at different temperatures and through which said substances are made to flow in countercurrent relationship, the liquid substance being:
fed to the top of the first of the pair of towers constituting the first stage of said system at a first concentration of the isotope to be concentrated,
enriched in concentration of said isotope by preferential isotope exchange in said first tower,
depleted in concentration of said isotope by said exchange in the second of said pair of towers to below said first concentration in the lower portion of said second tower, and discharged therefrom as waste to the process, the gaseous substance being continuously circulated from bottom to top through said pair of towers in an essentially closed recycle flow, and a portion of the flow of at least one of said liquid and gaseous substances being withdrawn from that portion of the system in which said isotope is concentrated therein; the improvement comprising increasing the flow ratio of liquid with respect to gas within the upper portion of said first tower, wherein said liquid is enriched in said isotope, and within the lower portion of said second tower, wherein said liquid is depleted in said isotope each to a value at least 5% above the corresponding flow ratio within the remaining lower portion of said first tower and the remaining upper portion of said second tower respectively, said increased flow ratios being provided by increasing the rate of liquid substance being fed to said first tower and withdrawing up to about 50 percent of said increased liquid substance flow from a location within the upper one-half of said first tower and reintroducing said withdrawn liquid at a location within the lower one-half portion of said second tower.

2. The process according to claim 1 wherein said liquid substance is water, said gaseous substance is hydrogen sulfide and said isotope to be concentrated is deuterium.

3. The process according to claim 1 wherein said first tower is maintained at a lower temperature than said second tower.

4. The process according to claim 1 wherein the amount of increased feed liquid flow to said first tower is about equal to the amount of liquid withdrawn from the upper one half portion of said first tower.

5. The method of claim 1 wherein said withdrawn liquid is reintroduced into the lower one half portion of said second tower at a location having process liquid of about the same isotope concentration after said reintroduction as the isotope concentration in said withdrawn liquid.

6. The method of claim 1 wherein said location for withdrawing said liquid is spaced from the top of said first tower at a distance that is less than the distance from the bottom of said second tower where said liquid is reintroduced therein.

7. The method of claim 1 wherein said liquid to gas flow ratio intermediate said locations for withdrawal and reintroduction within said first and second towers respectively is about 0.5 to 0.6 moles of liquid per mole of gas and said liquid to gas ratio above said location for withdrawal in said first tower and below said location for reintroduction in said second tower is more than 0.6 moles of liquid per mole of gas.

* * * * *